United States Patent
Lavoie et al.

(10) Patent No.: US 10,793,144 B2
(45) Date of Patent: Oct. 6, 2020

(54) VEHICLE REMOTE PARK-ASSIST COMMUNICATION COUNTERS

(71) Applicant: Ford Global Technologies, LLC, Dearborn, MI (US)

(72) Inventors: Erick Michael Lavoie, Dearborn, MI (US); Alyssa Chatten, Royal Oak, MI (US); Vivekanandh Elangovan, Canton, MI (US); Joby Jester, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 173 days.

(21) Appl. No.: 15/948,622

(22) Filed: Apr. 9, 2018

(65) Prior Publication Data
US 2019/0308615 A1    Oct. 10, 2019

(51) Int. Cl.
| | |
|---|---|
| *G05D 1/00* | (2006.01) |
| *B60W 30/06* | (2006.01) |
| *H04W 4/40* | (2018.01) |
| *G05D 1/02* | (2020.01) |

(52) U.S. Cl.
CPC ........... *B60W 30/06* (2013.01); *G05D 1/0016* (2013.01); *G05D 1/0212* (2013.01); *H04W 4/40* (2018.02); *B60W 2556/45* (2020.02); *G05D 2201/0213* (2013.01)

(58) Field of Classification Search
CPC .... B60W 30/06; B60W 2550/40; H04W 4/40; G05D 1/0016; G05D 1/0212
USPC .......................................................... 701/23
See application file for complete search history.

(56) References Cited

U.S. PATENT DOCUMENTS

| | | |
|---|---|---|
| 5,959,724 A | 9/1999 | Izumi |
| 6,275,754 B1 | 8/2001 | Shimizu |
| 6,356,828 B1 | 3/2002 | Shimizu |
| 6,452,617 B1 | 9/2002 | Bates |
| 6,476,730 B2 | 11/2002 | Kakinami |
| 6,477,260 B1 | 11/2002 | Shimomura |
| 6,657,555 B2 | 12/2003 | Shimizu |
| 6,683,539 B2 | 1/2004 | Trajkovic |

(Continued)

FOREIGN PATENT DOCUMENTS

| | | |
|---|---|---|
| CN | 101929921 A | 12/2010 |
| CN | 103818204 A | 5/2014 |

(Continued)

OTHER PUBLICATIONS

US 9,772,406 B2, 09/2017, Liu (withdrawn)

(Continued)

*Primary Examiner* — Peter D Nolan
*Assistant Examiner* — Wae L Louie
(74) *Attorney, Agent, or Firm* — Frank Lollo; Eversheds Sutherland (US) LLP (57) ABSTRACT

Method and apparatus are disclosed for vehicle remote park-assist communication counters. An example vehicle includes an autonomy unit for remote parking, a communication module, and a controller. The controller is to implement a counter into remote parking communication between the communication module and a mobile device and, when the counter exceeds a threshold, monitor for a reset vehicle event and a reset mobile event. The controller also is to reset the counter responsive to detecting at least one of the reset vehicle event and the reset mobile event.

20 Claims, 3 Drawing Sheets

(56) References Cited

U.S. PATENT DOCUMENTS

| | | |
|---|---|---|
| 6,724,322 B2 | 4/2004 | Tang |
| 6,744,364 B2 | 6/2004 | Wathen |
| 6,768,420 B2 | 7/2004 | McCarthy |
| 6,801,855 B1 | 10/2004 | Walters |
| 6,850,844 B1 | 1/2005 | Walters |
| 6,850,148 B2 | 2/2005 | Masudaya |
| 6,927,685 B2 | 8/2005 | Wathen |
| 6,997,048 B2 | 2/2006 | Komatsu |
| 7,042,332 B2 | 5/2006 | Takamura |
| 7,123,167 B2 | 10/2006 | Staniszewski |
| 7,307,655 B1 | 12/2007 | Okamoto |
| 7,663,508 B2 | 2/2010 | Teshima |
| 7,737,866 B2 | 6/2010 | Wu |
| 7,813,844 B2 | 10/2010 | Gensler |
| 7,825,828 B2 | 11/2010 | Watanabe |
| 7,834,778 B2 | 11/2010 | Browne |
| 7,847,709 B2 | 12/2010 | McCall |
| 7,850,078 B2 | 12/2010 | Christenson |
| 7,924,483 B2 | 4/2011 | Smith |
| 8,035,503 B2 | 10/2011 | Partin |
| 8,054,169 B2 | 11/2011 | Bettecken |
| 8,098,146 B2 | 1/2012 | Petrucelli |
| 8,126,450 B2 | 2/2012 | Howarter |
| 8,164,628 B2 | 4/2012 | Stein |
| 8,180,524 B2 | 5/2012 | Eguchi |
| 8,180,547 B2 | 5/2012 | Prasad |
| 8,224,313 B2 | 7/2012 | Howarter |
| 8,229,645 B2 | 7/2012 | Lee |
| 8,242,884 B2 | 8/2012 | Holcomb |
| 8,335,598 B2 | 12/2012 | Dickerhoof |
| 8,401,235 B2 | 3/2013 | Lee |
| 8,493,236 B2 | 7/2013 | Boehme |
| 8,538,408 B2 | 9/2013 | Howarter |
| 8,542,130 B2 | 9/2013 | Lavoie |
| 8,552,856 B2 | 10/2013 | McRae |
| 8,587,681 B2 | 11/2013 | Guidash |
| 8,594,616 B2 | 11/2013 | Gusikhin |
| 8,599,043 B2 | 12/2013 | Kadowaki |
| 8,618,945 B2 | 12/2013 | Furuta |
| 8,645,015 B2 | 2/2014 | Oetiker |
| 8,655,551 B2 | 2/2014 | Danz |
| 8,692,773 B2 | 4/2014 | You |
| 8,706,350 B2 | 4/2014 | Talty |
| 8,725,315 B2 | 5/2014 | Talty |
| 8,742,947 B2 | 6/2014 | Nakazono |
| 8,744,684 B2 | 6/2014 | Hong |
| 8,780,257 B2 | 7/2014 | Gidon |
| 8,787,868 B2 | 7/2014 | Leblanc |
| 8,825,262 B2 | 9/2014 | Lee |
| 8,933,778 B2 | 1/2015 | Birkel |
| 8,957,786 B2 | 2/2015 | Stempnik |
| 8,994,548 B2 * | 3/2015 | Gaboury ............... G08B 21/24 340/692 |
| 8,995,914 B2 * | 3/2015 | Nishidai ............... H04B 5/00 455/41.2 |
| 9,008,860 B2 | 4/2015 | Waldock |
| 9,014,920 B1 | 4/2015 | Torres |
| 9,078,200 B2 * | 7/2015 | Wuergler ............... H04W 4/80 |
| 9,086,879 B2 | 7/2015 | Gautama |
| 9,141,503 B1 * | 9/2015 | Chen ............... G06F 11/30 |
| 9,147,065 B2 * | 9/2015 | Lauer ............... G06F 21/36 |
| 9,154,920 B2 | 10/2015 | O'Brien |
| 9,168,955 B2 | 10/2015 | Noh |
| 9,193,387 B2 | 11/2015 | Auer |
| 9,225,531 B2 | 12/2015 | Hachey |
| 9,230,439 B2 | 1/2016 | Boulay |
| 9,233,710 B2 | 1/2016 | Lavoie |
| 9,273,966 B2 | 3/2016 | Bartels |
| 9,275,208 B2 | 3/2016 | Protopapas |
| 9,283,960 B1 | 3/2016 | Lavoie |
| 9,286,803 B2 | 3/2016 | Tippelhofer |
| 9,302,675 B2 | 4/2016 | Schilling |
| 9,318,022 B2 * | 4/2016 | Barth ............... G08G 1/141 |
| 9,379,567 B2 | 6/2016 | Kracker |
| 9,381,859 B2 | 7/2016 | Nagata |
| 9,429,657 B2 | 8/2016 | Sidhu |
| 9,429,947 B1 | 8/2016 | Wengreen |
| 9,454,251 B1 | 9/2016 | Guihot |
| 9,469,247 B2 | 10/2016 | Juneja |
| 9,493,187 B2 | 11/2016 | Pilutti |
| 9,506,774 B2 | 11/2016 | Shutko |
| 9,511,799 B2 | 12/2016 | Lavoie |
| 9,522,675 B1 | 12/2016 | You |
| 9,529,519 B2 | 12/2016 | Blumenberg |
| 9,557,741 B1 | 1/2017 | Elie |
| 9,563,990 B2 | 2/2017 | Khan |
| 9,595,145 B2 | 3/2017 | Avery |
| 9,598,051 B2 | 3/2017 | Okada |
| 9,606,241 B2 | 3/2017 | Varoglu |
| 9,616,923 B2 | 4/2017 | Lavoie |
| 9,637,117 B1 | 5/2017 | Gusikhin |
| 9,651,655 B2 | 5/2017 | Feldman |
| 9,656,690 B2 | 5/2017 | Shen |
| 9,666,040 B2 | 5/2017 | Flaherty |
| 9,688,306 B2 | 6/2017 | McClain |
| 9,701,280 B2 | 7/2017 | Schussmann |
| 9,712,977 B2 | 7/2017 | Tu |
| 9,715,816 B1 | 7/2017 | Adler |
| 9,725,069 B2 | 8/2017 | Krishnan |
| 9,731,714 B2 * | 8/2017 | Kiriya ............... G06T 7/20 |
| 9,731,764 B2 | 8/2017 | Baek |
| 9,754,173 B2 | 9/2017 | Kim |
| 9,809,218 B2 | 11/2017 | Elie |
| 9,811,085 B1 | 11/2017 | Hayes |
| 9,842,444 B2 | 12/2017 | Van Wiemeersch |
| 9,845,070 B2 | 12/2017 | Petel |
| 9,846,431 B2 | 12/2017 | Petel |
| 9,914,333 B2 | 3/2018 | Shank |
| 9,921,743 B2 | 3/2018 | Bryant |
| 9,946,255 B2 | 4/2018 | Matters |
| 9,959,763 B2 | 5/2018 | Miller |
| 9,971,130 B1 | 5/2018 | Lin |
| 9,975,504 B2 | 5/2018 | Dalke |
| 10,019,001 B2 | 7/2018 | Dang Van Nhan |
| 10,032,276 B1 | 7/2018 | Liu |
| 10,040,482 B1 | 8/2018 | Jung |
| 10,043,076 B1 | 8/2018 | Zhang |
| 10,131,347 B2 | 11/2018 | Kim |
| 10,192,113 B1 | 1/2019 | Liu |
| 10,246,055 B2 | 4/2019 | Farges |
| 10,268,341 B2 | 4/2019 | Kocienda |
| 2003/0060972 A1 | 3/2003 | Kakinami |
| 2003/0098792 A1 | 5/2003 | Edwards |
| 2003/0133027 A1 | 7/2003 | Itoh |
| 2005/0030156 A1 | 2/2005 | Alfonso |
| 2005/0068450 A1 | 3/2005 | Steinberg |
| 2005/0099275 A1 | 5/2005 | Kamdar |
| 2006/0010961 A1 | 1/2006 | Gibson |
| 2006/0227010 A1 | 10/2006 | Berstis |
| 2006/0235590 A1 | 10/2006 | Bolourchi |
| 2007/0230944 A1 | 10/2007 | Georgiev |
| 2008/0027591 A1 | 1/2008 | Lenser |
| 2008/0154464 A1 | 6/2008 | Sasajima |
| 2008/0154613 A1 | 6/2008 | Haulick |
| 2008/0238643 A1 | 10/2008 | Malen |
| 2008/0306683 A1 | 12/2008 | Ando |
| 2009/0096753 A1 | 4/2009 | Lim |
| 2009/0098907 A1 | 4/2009 | Huntzicker |
| 2009/0115639 A1 | 5/2009 | Proefke |
| 2009/0125181 A1 | 5/2009 | Luke |
| 2009/0125311 A1 | 5/2009 | Haulick |
| 2009/0128315 A1 | 5/2009 | Griesser |
| 2009/0146813 A1 | 6/2009 | Nuno |
| 2009/0174574 A1 | 7/2009 | Endo |
| 2009/0241031 A1 | 9/2009 | Gamaley |
| 2009/0289813 A1 | 11/2009 | Kwiecinski |
| 2009/0309970 A1 | 12/2009 | Ishii |
| 2009/0313095 A1 | 12/2009 | Hurpin |
| 2010/0025942 A1 | 2/2010 | Mangaroo |
| 2010/0061564 A1 | 3/2010 | Clemow |
| 2010/0114471 A1 | 5/2010 | Sugiyama |
| 2010/0114488 A1 | 5/2010 | Khamharn |
| 2010/0136944 A1 | 6/2010 | Taylor |
| 2010/0152972 A1 | 6/2010 | Attard |

(56) References Cited

U.S. PATENT DOCUMENTS

| | | |
|---|---|---|
| 2010/0156672 A1 | 6/2010 | Yoo |
| 2010/0245277 A1 | 9/2010 | Nakao |
| 2010/0259420 A1 | 10/2010 | Von Rehyer |
| 2011/0071725 A1 | 3/2011 | Kleve |
| 2011/0082613 A1 | 4/2011 | Oetiker |
| 2011/0190972 A1 | 8/2011 | Timmons |
| 2011/0205088 A1 | 8/2011 | Baker |
| 2011/0253463 A1 | 10/2011 | Smith |
| 2011/0309922 A1 | 12/2011 | Ghabra |
| 2012/0007741 A1 | 1/2012 | Laffey |
| 2012/0072067 A1 | 3/2012 | Jecker |
| 2012/0083960 A1 | 4/2012 | Zhu |
| 2012/0173080 A1 | 7/2012 | Cluff |
| 2012/0176332 A1 | 7/2012 | Fujibayashi |
| 2012/0271500 A1 | 10/2012 | Tsimhoni |
| 2012/0303258 A1 | 11/2012 | Pampus |
| 2012/0323643 A1 | 12/2012 | Volz |
| 2012/0323700 A1 | 12/2012 | Aleksandrovich |
| 2013/0021171 A1 | 1/2013 | Hsu |
| 2013/0024202 A1 | 1/2013 | Harris |
| 2013/0043989 A1 | 2/2013 | Niemz |
| 2013/0073119 A1 | 3/2013 | Huger |
| 2013/0109342 A1 | 5/2013 | Welch |
| 2013/0110342 A1 | 5/2013 | Wuttke |
| 2013/0113936 A1 | 5/2013 | Cohen |
| 2013/0124061 A1 | 5/2013 | Khanafer |
| 2013/0145441 A1 | 6/2013 | Mujumdar |
| 2013/0211623 A1 | 8/2013 | Thompson |
| 2013/0231824 A1 | 9/2013 | Wilson |
| 2013/0289825 A1 | 10/2013 | Noh |
| 2013/0314502 A1 | 11/2013 | Urbach |
| 2013/0317944 A1 | 11/2013 | Huang |
| 2014/0052323 A1 | 2/2014 | Reichel |
| 2014/0095994 A1 | 4/2014 | Kim |
| 2014/0096051 A1 | 4/2014 | Boblett |
| 2014/0121930 A1 | 5/2014 | Allexi |
| 2014/0147032 A1 | 5/2014 | Yous |
| 2014/0156107 A1 | 6/2014 | Karasawa |
| 2014/0188339 A1 | 7/2014 | Moon |
| 2014/0222252 A1 | 8/2014 | Matters |
| 2014/0240502 A1 | 8/2014 | Strauss |
| 2014/0282931 A1 | 9/2014 | Protopapas |
| 2014/0297120 A1 | 10/2014 | Cotgrove |
| 2014/0300504 A1 | 10/2014 | Shaffer |
| 2014/0303839 A1 | 10/2014 | Filev |
| 2014/0320318 A1 | 10/2014 | Victor |
| 2014/0327736 A1 | 11/2014 | DeJohn |
| 2014/0350804 A1 | 11/2014 | Park |
| 2014/0350855 A1 | 11/2014 | Vishnuvajhala |
| 2014/0365108 A1 | 12/2014 | You |
| 2014/0365126 A1 | 12/2014 | Vulcano |
| 2015/0022468 A1 | 1/2015 | Cha |
| 2015/0039173 A1 | 2/2015 | Beaurepaire |
| 2015/0039224 A1 | 2/2015 | Tuukkanen |
| 2015/0048927 A1 | 2/2015 | Simmons |
| 2015/0066545 A1 | 3/2015 | Kotecha |
| 2015/0077522 A1 | 3/2015 | Suzuki |
| 2015/0088360 A1 | 3/2015 | Bonnet |
| 2015/0091741 A1 | 4/2015 | Stefik |
| 2015/0109116 A1 | 4/2015 | Grimm |
| 2015/0116079 A1 | 4/2015 | Mishra |
| 2015/0123818 A1 | 5/2015 | Sellschopp |
| 2015/0127208 A1 | 5/2015 | Jecker |
| 2015/0149265 A1 | 5/2015 | Huntzicker |
| 2015/0151789 A1 | 6/2015 | Lee |
| 2015/0153178 A1 | 6/2015 | Koo |
| 2015/0161890 A1 | 6/2015 | Huntzicker |
| 2015/0163649 A1 | 6/2015 | Chen |
| 2015/0197278 A1 | 7/2015 | Boos |
| 2015/0203111 A1 | 7/2015 | Bonnet |
| 2015/0203156 A1 | 7/2015 | Hafner |
| 2015/0210317 A1 | 7/2015 | Hafner |
| 2015/0217693 A1 | 8/2015 | Pliefke |
| 2015/0219464 A1 | 8/2015 | Beaurepaire |
| 2015/0220791 A1 | 8/2015 | Wu |
| 2015/0226146 A1 | 8/2015 | Elwart |
| 2015/0274016 A1 | 10/2015 | Kinoshita |
| 2015/0286340 A1 | 10/2015 | Send |
| 2015/0329110 A1 | 11/2015 | Stefan |
| 2015/0344028 A1 | 12/2015 | Gieseke |
| 2015/0346727 A1 | 12/2015 | Ramanujam |
| 2015/0360720 A1 | 12/2015 | Li |
| 2015/0365401 A1 | 12/2015 | Brown |
| 2015/0371541 A1 | 12/2015 | Korman |
| 2015/0375741 A1* | 12/2015 | Kiriya ............... G06K 9/00355 |
| | | 701/2 |
| 2015/0375742 A1 | 12/2015 | Gebert |
| 2016/0012653 A1 | 1/2016 | Soroka |
| 2016/0012726 A1 | 1/2016 | Wang |
| 2016/0018821 A1 | 1/2016 | Akita |
| 2016/0055749 A1 | 2/2016 | Nicoll |
| 2016/0153778 A1 | 2/2016 | Singh |
| 2016/0062354 A1 | 3/2016 | Li |
| 2016/0068158 A1 | 3/2016 | Elwart |
| 2016/0068187 A1 | 3/2016 | Hata |
| 2016/0075369 A1 | 3/2016 | Lavoie |
| 2016/0090055 A1 | 3/2016 | Breed |
| 2016/0107689 A1 | 4/2016 | Lee |
| 2016/0112846 A1 | 4/2016 | Siswick |
| 2016/0114726 A1 | 4/2016 | Nagata |
| 2016/0117926 A1 | 4/2016 | Akavaram |
| 2016/0127664 A1 | 5/2016 | Bruder |
| 2016/0139244 A1 | 5/2016 | Holtman |
| 2016/0144857 A1 | 5/2016 | Ohshima |
| 2016/0152263 A1 | 6/2016 | Singh |
| 2016/0170494 A1 | 6/2016 | Bonnet |
| 2016/0185389 A1 | 6/2016 | Ishijima |
| 2016/0189435 A1 | 6/2016 | Beaurepaire |
| 2016/0207528 A1 | 7/2016 | Stefan |
| 2016/0224025 A1* | 8/2016 | Petel ................... B60Q 9/002 |
| 2016/0229452 A1* | 8/2016 | Lavoie ................ B60W 10/04 |
| 2016/0236680 A1 | 8/2016 | Lavoie |
| 2016/0249294 A1 | 8/2016 | Lee |
| 2016/0257304 A1 | 9/2016 | Lavoie |
| 2016/0272244 A1 | 9/2016 | Imai |
| 2016/0282442 A1 | 9/2016 | O'Mahony |
| 2016/0284217 A1 | 9/2016 | Lee |
| 2016/0288657 A1 | 10/2016 | Tokura |
| 2016/0300417 A1 | 10/2016 | Hatton |
| 2016/0304087 A1 | 10/2016 | Noh |
| 2016/0304088 A1 | 10/2016 | Barth |
| 2016/0349362 A1 | 10/2016 | Rohr |
| 2016/0321445 A1 | 11/2016 | Turgeman |
| 2016/0321926 A1 | 11/2016 | Mayer |
| 2016/0334797 A1 | 11/2016 | Ross |
| 2016/0347280 A1 | 12/2016 | Daman |
| 2016/0355125 A1 | 12/2016 | Herbert |
| 2016/0357354 A1 | 12/2016 | Chen |
| 2016/0358474 A1 | 12/2016 | Uppal |
| 2016/0368489 A1 | 12/2016 | Aich |
| 2016/0371607 A1 | 12/2016 | Rosen |
| 2016/0371691 A1 | 12/2016 | Kang |
| 2017/0001650 A1 | 1/2017 | Park |
| 2017/0008563 A1 | 1/2017 | Popken |
| 2017/0026198 A1 | 1/2017 | Ochiai et al. |
| 2017/0028985 A1 | 2/2017 | Kiyokawa |
| 2017/0030722 A1 | 2/2017 | Kojo |
| 2017/0032593 A1 | 2/2017 | Patel |
| 2017/0072947 A1 | 3/2017 | Lavoie |
| 2017/0073004 A1 | 3/2017 | Shepard |
| 2017/0076603 A1 | 3/2017 | Bostick |
| 2017/0097504 A1 | 4/2017 | Takamatsu |
| 2017/0116790 A1 | 4/2017 | Kusens |
| 2017/0123423 A1 | 5/2017 | Sako |
| 2017/0129537 A1 | 5/2017 | Kim |
| 2017/0129538 A1 | 5/2017 | Stefan |
| 2017/0132482 A1 | 5/2017 | Kim |
| 2017/0144654 A1 | 5/2017 | Sham |
| 2017/0144656 A1 | 5/2017 | Kim |
| 2017/0147995 A1 | 5/2017 | Kalimi |
| 2017/0168479 A1 | 6/2017 | Dang |
| 2017/0192428 A1 | 7/2017 | Vogt |
| 2017/0200369 A1 | 7/2017 | Miller |
| 2017/0203763 A1 | 7/2017 | Yamada |

(56) References Cited

U.S. PATENT DOCUMENTS

| | | |
|---|---|---|
| 2017/0208438 A1 | 7/2017 | Dickow |
| 2017/0297385 A1 | 10/2017 | Kim |
| 2017/0297620 A1 | 10/2017 | Lavoie |
| 2017/0301241 A1 | 10/2017 | Urhahne |
| 2017/0308075 A1 | 10/2017 | Whitaker |
| 2017/0336788 A1 | 11/2017 | Iagnemma |
| 2017/0357317 A1 | 12/2017 | Chaudhri |
| 2017/0371514 A1 | 12/2017 | Cullin |
| 2018/0015878 A1 | 1/2018 | McNew |
| 2018/0024559 A1 | 1/2018 | Seo |
| 2018/0029591 A1 | 2/2018 | Lavoie |
| 2018/0029641 A1 | 2/2018 | Solar |
| 2018/0039264 A1 | 2/2018 | Messner |
| 2018/0043884 A1 | 2/2018 | Johnson |
| 2018/0056939 A1 | 3/2018 | van Roermund |
| 2018/0056989 A1 | 3/2018 | Donald |
| 2018/0082588 A1 | 3/2018 | Hoffman, Jr. |
| 2018/0088330 A1 | 3/2018 | Giannuzzi |
| 2018/0093663 A1 | 4/2018 | Kim |
| 2018/0105165 A1* | 4/2018 | Alarcon ............ H04L 67/12 |
| 2018/0105167 A1 | 4/2018 | Kim |
| 2018/0148094 A1 | 5/2018 | Mukaiyama |
| 2018/0174460 A1 | 6/2018 | Jung |
| 2018/0189971 A1 | 7/2018 | Hildreth |
| 2018/0194344 A1 | 7/2018 | Wang |
| 2018/0196963 A1 | 7/2018 | Bandiwdekar |
| 2018/0224863 A1 | 8/2018 | Fu |
| 2018/0236957 A1 | 8/2018 | Min |
| 2018/0284802 A1 | 10/2018 | Tsai |
| 2018/0286072 A1 | 10/2018 | Tsai |
| 2018/0339654 A1 | 11/2018 | Kim |
| 2018/0345851 A1 | 12/2018 | Lavoie |
| 2018/0364731 A1 | 12/2018 | Liu |
| 2019/0005445 A1 | 1/2019 | Bahrainwala |
| 2019/0042003 A1 | 2/2019 | Parazynski |
| 2019/0066503 A1 | 2/2019 | Li |
| 2019/0103027 A1 | 4/2019 | Wheeler |
| 2019/0137990 A1 | 5/2019 | Golgiri |
| 2019/0308615 A1* | 10/2019 | Lavoie ............ G05D 1/0212 |

FOREIGN PATENT DOCUMENTS

| | | |
|---|---|---|
| CN | 104183153 A | 12/2014 |
| CN | 104485013 A | 4/2015 |
| CN | 104691544 A | 6/2015 |
| CN | 103049159 B | 7/2015 |
| CN | 105513412 A | 4/2016 |
| CN | 105588563 A | 5/2016 |
| CN | 105599703 A | 5/2016 |
| CN | 105774691 A | 7/2016 |
| CN | 106027749 A | 10/2016 |
| CN | 205719000 U | 11/2016 |
| CN | 106598630 A | 4/2017 |
| CN | 106782572 A | 5/2017 |
| CN | 106945662 A | 7/2017 |
| CN | 104290751 B | 1/2018 |
| DE | 3844340 A1 | 7/1990 |
| DE | 19817142 A1 | 10/1999 |
| DE | 19821163 A1 | 11/1999 |
| DE | 102005006966 A1 | 9/2005 |
| DE | 102006058213 A1 | 7/2008 |
| DE | 102009024083 A1 | 7/2010 |
| DE | 102016224529 A1 | 3/2011 |
| DE | 102016226008 A1 | 3/2011 |
| DE | 102012008858 A1 | 11/2012 |
| DE | 102009060169 A1 | 6/2013 |
| DE | 102011080148 A1 | 7/2013 |
| DE | 102012200725 A1 | 9/2013 |
| DE | 102010034129 B2 | 10/2013 |
| DE | 102011122421 A1 | 6/2014 |
| DE | 102012222972 A1 | 6/2014 |
| DE | 102013016342 A1 | 1/2015 |
| DE | 102014009077 A1 | 2/2015 |
| DE | 102012215218 A1 | 4/2015 |
| DE | 102012222972 A1 | 5/2015 |
| DE | 102013019904 A1 | 5/2015 |
| DE | 102014007915 A1 | 12/2015 |
| DE | 102014007915 A1 | 2/2016 |
| DE | 102014011802 A1 | 2/2016 |
| DE | 102014111570 A1 | 2/2016 |
| DE | 102014015655 A1 | 4/2016 |
| DE | 102014226458 A1 | 6/2016 |
| DE | 102015209976 A1 | 12/2016 |
| DE | 102014015655 A1 | 5/2017 |
| DE | 102016011916 A1 | 6/2017 |
| DE | 102016125282 A1 | 7/2017 |
| DE | 102015221224 A1 | 12/2017 |
| DE | 102016011916 A1 | 2/2018 |
| DE | 102016125282 A1 | 6/2018 |
| DE | 102016211021 A1 | 6/2018 |
| EP | 2653367 A1 | 6/2000 |
| EP | 2768718 B1 | 6/2011 |
| EP | 2289768 A2 | 10/2013 |
| EP | 2620351 B1 | 12/2015 |
| EP | 2295281 A1 | 3/2016 |
| EP | 2135788 B1 | 6/2016 |
| EP | 2135788 B1 | 6/2017 |
| FR | 3021798 A1 | 12/2012 |
| GB | 2534471 A | 10/2000 |
| GB | 2344481 A | 12/2012 |
| GB | 2497836 A | 9/2014 |
| GB | 2481324 A | 3/2015 |
| GB | 2517835 A | 5/2016 |
| GB | 2491720 A | 7/2016 |
| JP | 2004142543 A | 5/2004 |
| JP | 2004287884 A | 10/2004 |
| JP | 2005193742 A | 7/2005 |
| JP | 2004142543 A | 4/2009 |
| JP | 2016119032 A | 4/2009 |
| JP | 2004287884 A | 7/2014 |
| JP | 2014134082 A | 7/2014 |
| JP | 2016119032 A | 6/2016 |
| JP | 2014134082 A | 7/2016 |
| JP | 2014125196 A | 4/2018 |
| KR | 20130106005 A | 6/2006 |
| KR | 20160039460 A | 5/2008 |
| KR | 20100006714 A | 1/2010 |
| KR | 20160051993 A | 1/2010 |
| KR | 20130106005 A | 9/2013 |
| KR | 20160039460 A | 4/2016 |
| KR | 20100006714 A | 5/2016 |
| WO | WO 2017/112444 A1 | 12/2010 |
| WO | WO 2017/118510 A1 | 6/2011 |
| WO | WO 2006/064544 A1 | 11/2011 |
| WO | WO 2017/125514 A1 | 1/2013 |
| WO | WO 2008/055567 A1 | 4/2013 |
| WO | WO 2010/006981 A1 | 8/2013 |
| WO | WO 2011/141096 A1 | 7/2014 |
| WO | WO 2015/068032 A1 | 5/2015 |
| WO | WO 2015/193058 A1 | 12/2015 |
| WO | WO 2016/046269 A1 | 3/2016 |
| WO | WO 2015/068032 A1 | 8/2016 |
| WO | WO 2015/193058 A1 | 9/2016 |
| WO | WO 2017/062448 A1 | 4/2017 |
| WO | WO 2016/128200 A1 | 5/2017 |
| WO | WO 2016/134822 A1 | 6/2017 |
| WO | WO 2017/062448 A1 | 6/2017 |
| WO | WO 2017/073159 A1 | 6/2017 |
| WO | WO 2017/096307 A1 | 6/2017 |
| WO | WO 2017/097942 A1 | 7/2017 |
| WO | WO 2017/118510 A1 | 7/2017 |

OTHER PUBLICATIONS

Alberto Broggi and Elena Cardarelli, Vehicle Detection for Autonomous Parking Using a Soft-Cascade ADA Boost Classifier, Jun. 8, 2014.

Automatically Into the Parking Space—https://www.mercedes-benz.com/en/mercedes-benz/next/automation/automatically-into-the-parking-space/; Oct. 27, 2014.

Bill Howard, Bosch's View of the Future Car: Truly Keyless Entry, Haptic Feedback, Smart Parking, Cybersecurity, Jan. 9, 2017, 8 Pages.

(56) References Cited

OTHER PUBLICATIONS

ChargeItSpot Locations, Find a Phone Charging Station Near You, retrieved at https://chargeitspot.com/locations/ on Nov. 28, 2017.
Core System Requirements Specification (SyRS), Jun. 30, 2011, Research and Innovative Technology Administration.
Daimler Ag, Remote Parking Pilot, Mar. 2016 (3 Pages).
Land Rover, Land Rover Remote Control Via Iphone RC Range Rover Sport Showcase—Autogefühl, Retrieved from https://www.youtube.com/watch?v=4ZaaYNaEFio (at 43 seconds and 1 minute 42 seconds), Sep. 16, 2015.
Perpendicular Parking—https://prezi.com/toqmfyxriksl/perpendicular-parking/.
SafeCharge, Secure Cell Phone Charging Stations & Lockers, retrieved at https://www.thesafecharge.com on Nov. 28, 2017.
Search Report dated Jan. 19, 2018 for GB Patent Application No. 1711988.4 (3 pages).
Search Report dated Jul. 11, 2017 for GB Patent Application No. 1700447.4 (3 Pages).
Search Report dated May 21, 2018 for Great Britain Patent Application No. GB 1800277.4 (5 Pages).
Search Report dated Nov. 22, 2018 for GB Patent Application No. GB 1809829.3 (6 pages).
Search Report dated Nov. 27, 2018 for GB Patent Application No. GB 1809112.4 (3 pages).
Search Report dated Nov. 28, 2017, for GB Patent Application No. GB 1710916.6 (4 Pages).
Search Report dated Nov. 28, 2018 for GB Patent Application No. GB 1809842.6 (5 pages).
Search Report dated Oct. 10, 2018 for GB Patent Application No. 1806499.8 (4 pages).
Tesla Model S Owner's Manual v2018.44. Oct. 29, 2018.
Vehicle'S Orientation Measurement Method by Single-Camera Image Using Known-Shaped Planar Object, Nozomu Araki, Takao Sato, Yasuo Konishi and Hiroyuki Ishigaki, 2010.
Land Rover develops a smartphone remote control for its SUVs, James Vincent, Jun. 18, 2015.
Al-Sherbaz, Ali et al., Hybridisation of GNSS with other wireless/sensors technologies on board smartphones to offer seamless outdoors-indoors positioning for LBS applications, Apr. 2016, 3 pages.
Jingbin Liu, IParking: An Intelligent Indoor Location-Based Smartphone Parking Service, Oct. 31, 2012, 15 pages.

\* cited by examiner

VEHICLE REMOTE PARK-ASSIST COMMUNICATION COUNTERS

TECHNICAL FIELD

The present disclosure generally relates to communication counters and, more specifically, to vehicle remote park-assist communication counters.

BACKGROUND

Many vehicles include motive functions that are at least partially autonomously controlled by the vehicle. For example, some vehicles include cruise control in which the vehicle controls acceleration and/or deceleration of the vehicle so that a speed of the vehicle is maintained. For instance, some vehicles include park-assist features in which the vehicle autonomously controls motive functions of the vehicle to park the vehicle into a parking spot. Further, some vehicles include remote park-assist features in which a user initiates the park-assist features remotely from a mobile device.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for vehicle remote park-assist communication counters. An example disclosed vehicle includes an autonomy unit for remote parking, a communication module, and a controller. The controller is to implement a counter into remote parking communication between the communication module and a mobile device and, when the counter exceeds a threshold, monitor for a reset vehicle event and a reset mobile event. The controller also is to reset the counter responsive to detecting at least one of the reset vehicle event and the reset mobile event.

An example disclosed vehicle includes implementing, via a processor of a vehicle, a counter into remote parking communication between a communication module of the vehicle and a mobile device. The example disclosed method also includes monitoring, via the processor, for a reset vehicle event and a reset mobile event when the counter exceeds a threshold and resetting, via the processor, the counter responsive to detecting at least one of the reset vehicle event and the reset mobile event.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Many vehicles include motive functions that are at least partially autonomously controlled by the vehicle. For example, some vehicles include cruise control in which the vehicle controls acceleration and/or deceleration of the vehicle so that a speed of the vehicle is maintained. For instance, some vehicles include park-assist features in which the vehicle autonomously controls motive functions of the vehicle to park the vehicle into a parking spot. Further, some vehicles include remote park-assist features in which a user initiates the park-assist features remotely from a mobile device.

For instance, remote park-assist systems are configured to autonomously park a vehicle when a driver has already exited the vehicle. Some remote park-assist system require the driver to provide a continuous input via a mobile device in wireless communication with the vehicle to instruct the vehicle to autonomously park in the parking spot. In some instances, there may be latency in communication between the mobile device and the vehicle that causes the vehicle to continue to receive an input from the mobile device when the operator is no longer providing an input to the mobile device. In such instances, the vehicle may potentially continue to perform remote park-assist functions when the operator no longer desires to perform such functions.

Examples disclosed herein detect unwanted latency in communication to initiate remote park-assist features of a vehicle by implementing a counter into the communication between the mobile device and the vehicle. For example, the vehicle wirelessly transmits signals that include counters to the mobile device at predetermined time intervals while remote park-assist is active for the vehicle. The signals including the counters are configured to trigger the mobile device to transmit corresponding return signals to the vehicle. The vehicle compares the counters of the transmitted signals and the corresponding return signals to determine whether there is latency in the wireless communication between the vehicle and the mobile device. For example, the vehicle identifies latency in the wireless communication if the counters of the return signals are not received in sequence.

In some instances, a counter potentially may reach a maximum counter value over time after extended use. To enable the vehicle to continue to monitor for latency in the remote park-assist communication, the vehicle of examples disclosed herein is configured to reset the counter. Further, the vehicle is configured to reset the wireless connection between the vehicle and the mobile device when the counter is reset for increased security purposes. In some instances, if the counter and wireless connection are reset while the remote park-assist is being performed, the user potentially may notice an undesirable delay before the user is again able to interact with the vehicle via the mobile device for the remote park-assist.

Methods and apparatus disclosed herein reset a communication counter for a remote park-assist system of a vehicle in a manner that prevents a user from noticing a delay in functionality. The vehicle includes a controller that utilizes a threshold to prevent an incremental time-based counter from reaching a maximum counter value. That is, the threshold corresponds with a counter value that is less than the maximum counter value to prevent the maximum counter value from being reached. When the incremental time-based counter exceeds the threshold, the controller determines whether to reset the incremental time-based counter based upon detection of a change in state of the vehicle or mobile device initiating remote park-assist of the vehicle. For example, the controller resets the incremental time-based counter in response to detecting a reset mobile event, such as (i) activation of a remote parking app on the mobile device, (ii) activation of another app on the mobile device while remote parking is active, (iii) the mobile device conducting a call, text, and/or messaging session while the remote parking is active, (iv) a user dropping the mobile device while the remote parking is active, (v) the mobile device being located beyond a tethering range for the remote parking, and/or (vi) the mobile device not receiving an input from a user for a threshold period of time. Additionally or alternatively, the controller resets the incremental time-based counter in response to detecting a reset vehicle event, such as (i) the autonomy unit identifying an available parking spot, (ii) the autonomy unit detecting an obstacle or another stop event while the remote parking is active, (iii) the autonomy unit detecting that the vehicle is stationary for a threshold period of time while the remote parking is active, and/or (iv) a communication module transitioning from a remote parking state to a phone-as-a-key state.

As used herein, "remote parking," "vehicle remote park-assist," "remote park-assist," and "RePA" refer to a system in which a vehicle controls its motive functions without direct steering or velocity input from a driver to autonomously park within a parking spot while the driver is located outside of the vehicle. For example, an autonomy unit of a remote park-assist system controls the motive functions of the vehicle upon receiving a remote initiation signal from a driver.

As used herein, "passive entry passive start," "passive-entry passive-start" and "PEPS" refer to a system of vehicle that is configured to perform passive entry and passive start for the vehicle. As used herein, "passive entry" and "passive-entry" refer to a system of a vehicle that unlock(s) and/or open(s) one or more doors of the vehicle upon detecting that a key fob and/or phone-as-a-key is proximate to a door of the vehicle. Some passive entry systems trigger a door for opening in response to detecting that a key fob and/or phone-as-a-key is approaching and/or within a predetermined range of the vehicle. In such examples, the door is unlocked in response to detecting that (i) a user has touched a handle of the door and (ii) the key fob and/or phone-as-a-key is proximate to the door when the handle is touched. As used herein, "passive start" and "passive-start" refer to a system of a vehicle that activates ignition of an engine of the vehicle upon detecting that a key fob and/or phone-as-a-key is within a cabin of the vehicle (e.g., such that drive-away is enabled). Some passive start systems trigger an engine for ignition in response to detecting that a key fob and/or phone-as-a-key is approaching and/or within a predetermined range of the vehicle. In such examples, the engine is started in response to detecting that (i) a user has engaged an ignition switch of the vehicle and (ii) the key fob and/or phone-as-a-key is within the cabin when the ignition switch is engaged.

As used herein, a "key fob" refers to a dedicated electronic mobile device that wirelessly communicates with a vehicle to unlock and/or lock vehicle door(s), open and/or close the vehicle door(s), activate an engine of the vehicle, and/or control other function(s) of the vehicle. In some examples, a user of a vehicle utilizes another mobile device that functions as a phone-as-a-key for wireless communication with the vehicle. As used herein, a "phone-as-a-key" refers to an electronic mobile device (e.g., a smart phone, a wearable, a smart watch, a tablet, etc.) that includes hardware and/or software to function as a key fob.

As used herein, a "tethered" device refers to a mobile device that is enabled to send instructions to a vehicle to perform remote parking. For example, a mobile device is tethered to a vehicle responsive to the mobile device being wirelessly communicatively coupled to the vehicle and located within a predetermined tethering range (e.g., 6 meters) of the vehicle. In such examples, a mobile device that sends instructions to a vehicle to perform remote parking is untethered from the vehicle if the mobile device is beyond the tethering range of the vehicle.

Figure 1:
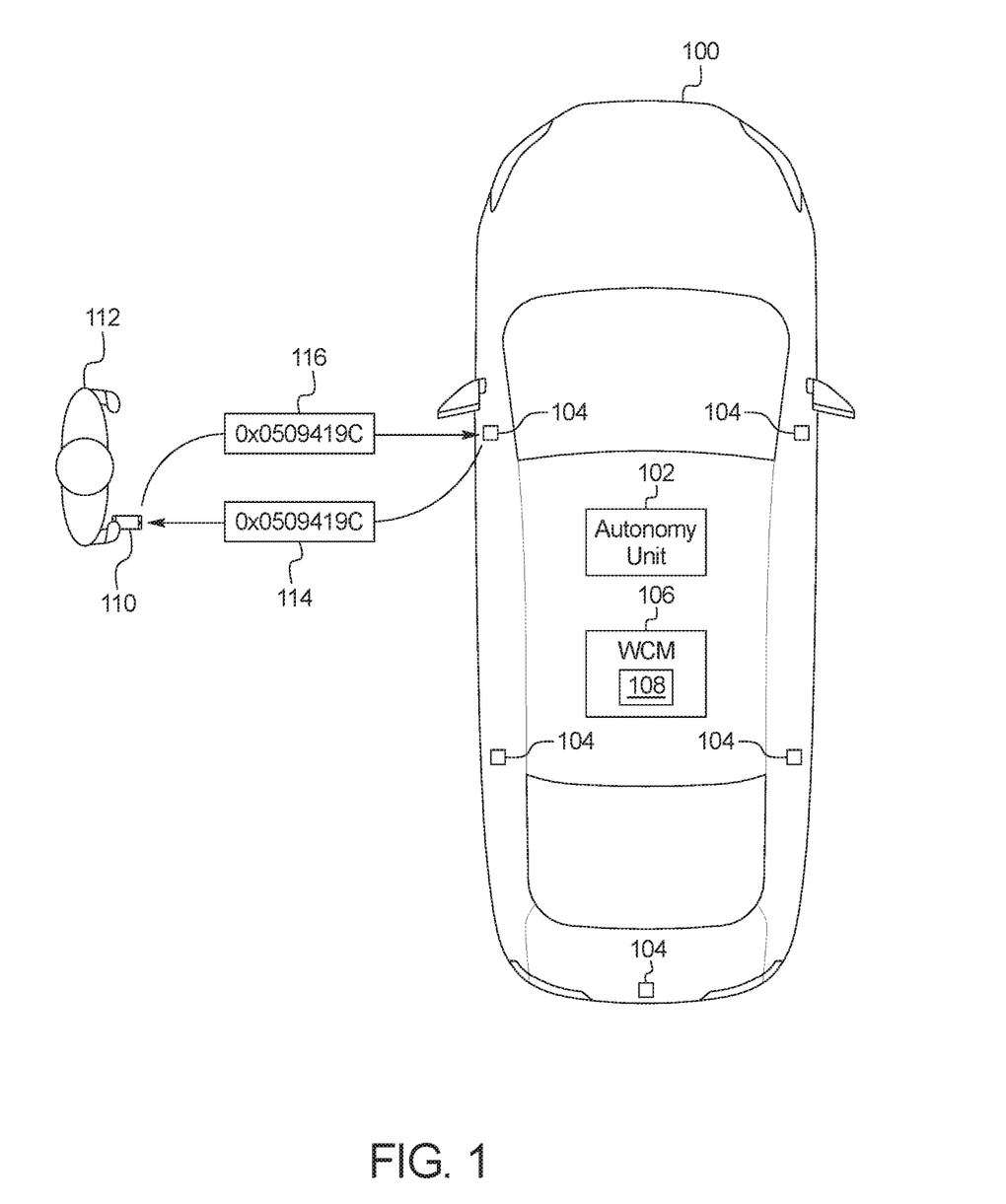
FIG. 1 illustrates an example vehicle in accordance with the teachings herein.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be semi-autonomous (e.g., some routine motive functions controlled by the vehicle 100) or autonomous (e.g., motive functions are controlled by the vehicle 100 without direct driver input). In the illustrated example, the vehicle 100 includes an autonomy unit 102, antenna modules 104, a wireless communication module 106 (also referred to as a communication module), and a counter controller 108.

The autonomy unit 102 controls performance of autonomous and/or semi-autonomous driving maneuvers of the vehicle 100. For example, the autonomy unit 102 performs autonomous and/or semi-autonomous driving maneuvers for remote park-assist based upon, at least in part, image(s) and/or video collected by exterior camera(s) of the vehicle 100, data collected by exterior proximity sensor(s) of the vehicle 100, and/or signals sent by a mobile device 110 of a user 112.

The autonomy unit 102 is an electronic control unit (ECU) of the vehicle 100. ECUs monitor and control the subsystems of the vehicle 100. For example, the ECUs are discrete sets of electronics that include their own circuit(s) (e.g., integrated circuits, microprocessors, memory, storage, etc.) and firmware, sensors, actuators, and/or mounting hardware. In some examples, the ECUs communicate and exchange information via a vehicle data bus (e.g., a vehicle data bus 202 of FIG. 2). Additionally, the ECUs may communicate properties (e.g., status of the ECUs, sensor readings, control state, error and diagnostic codes, etc.) to and/or receive requests from each other. For example, the vehicle 100 may have dozens of ECUs that are positioned in various locations around the vehicle 100 and are communicatively coupled by the vehicle data bus.

The antenna modules 104 of the illustrated example include hardware (e.g., processors, memory, storage, antenna, etc.) and software to control wireless network interface(s). For example, the antenna modules 104 include communication controllers for a personal or local area wireless network (e.g., Bluetooth®, Bluetooth® Low Energy (BLE), Zigbee®, Z-Wave®, Wi-Fi®, etc.). When the antenna modules 104 are configured to implement BLE, the antenna modules 104 may be referred to as "BLE Antenna Modules (BLEAMs)." The antenna modules 104 of the illustrated example communicatively couple to the mobile device 110 and measure and/or receive measurements of the signal strength of the signals (e.g., received signal strength indicators) broadcast by the mobile device 110 to facilitate determining a location of the mobile device 110 relative to the vehicle 100. Further, in some examples, the vehicle 100 includes one or more internal antenna modules (not shown) located inside a cabin of the vehicle 100 to facilitate determining when the mobile device 110 is within the cabin of the vehicle 100 (e.g., to enable passive-start of the vehicle 100).

Additionally or alternatively, one or more of the antenna modules 104 each includes a communication controller for Near Field Communication (NFC), ultra-wide band (UWB) communication, ultra-high frequency (UHF) communication, and/or low frequency (LF) communication. Further, in some examples, one or more of the antenna modules 104 each includes a communication controller for cellular network(s), such as Global System for Mobile Communications (GSM), Universal Mobile Telecommunications System (UMTS), Long Term Evolution (LTE), Code Division Multiple Access (CDMA).

The wireless communication module 106 is communicatively coupled to the antenna modules 104 to track a location of the mobile device 110 relative to the vehicle 100. In some examples, when the antenna modules 104 are configured to implement BLE, the wireless communication module 106 may be referred to as "BLE Module (BLEM)." The wireless communication module 106 receives and analyzes the signal strength measurements (e.g., received signal strength indicators) between the antenna modules 104 and the mobile device 110. Based on these measurements, the wireless communication module 106 determines (1) whether the mobile device 110 is within a tethering range for remote park-assist of the vehicle 100, and/or (2) a location of the mobile device 110 relative to the vehicle 100. In the illustrated example, the wireless communication module 106 includes the counter controller 108.

In operation, the counter controller 108 implements a counter (also referred to as a communication counter) into wireless communication between the vehicle 100 and the mobile device 110 to detect for latency in the wireless communication. For example, when remote park-assist is active for the vehicle 100, one or more of the antenna modules 104 send a series of signals 114 to the mobile device 110 (e.g., at regular intervals). Each of the signals 114 sent by one or more of the antenna modules 104 includes a respective counter value. In some examples, the counter increments or decrements sequentially as the signals 114 are sent to the mobile device 110. For example, a first signal sent by one or more of the antenna modules 104 includes a counter value of '1,' a subsequent second signal includes a counter value of '2,' a subsequent third signal includes a counter value of '3,' etc.

Further, upon receiving such a signal from one or more of the antenna modules 104 of the vehicle 100, the mobile device 110 sends a corresponding return signal to the one or more of the antenna modules 104. That is, the signals 114 sent to the mobile device 110 trigger the mobile device to send corresponding return signals 116 to the vehicle 100. The return signals 116 sent by the mobile device 110 includes the counters of the signals 114 that triggered the return signals 116. For example, the mobile device 110 sends a first return signal that includes a counter value of '1' in response to receiving the first signal that includes a counter value of '1,' sends a second return signal that includes a counter value of '2' in response to receiving the second signal that includes a counter value of '2,' sends a third return signal that includes a counter value of '3' in response to receiving the third signal that includes a counter value of '3,' etc.

The counter controller 108 of the vehicle 100 compares the counters of the return signals 116 received by the one or more of the antenna modules 104 to determine whether there is latency in wireless communication between the vehicle 100 and the mobile device 110. In the illustrated example, the counter controller 108 detects latency in the wireless communication if the return signals 116 are not received in the same sequence as the corresponding signals 114 were sent. For example, if the counters of the signals 114 are sent sequentially (e.g., 1, 2, 3, etc.) and the counters of the return signals 116 are received in the same sequence (e.g., 1, 2, 3, etc.), the counter controller 108 detects no latency in the wireless communication. In response to the counter controller 108 determining that the counter of the wireless communication for remote park-assist is received in sequence (e.g., increments sequentially, decrements sequentially), the autonomy unit 102 performs motive functions for remote park-assist as initiated by the mobile device 110. In contrast, if the counters of the signals 114 are sent sequentially (e.g., 1, 2, 3, etc.) and the counters of the return signals 116 are not received in the same sequence (e.g., 1, 3, 2, etc.), the counter controller 108 detects latency in the wireless communication. In response to the counter controller 108 determining that the counter of the wireless communication for remote park-assist is not received in sequence (e.g., does not increment sequentially, does not decrement sequentially), the autonomy unit 102 does not perform motive functions for remote park-assist of the vehicle 100.

To prevent the counter from reaching an extremum counter value (e.g., a maximum counter value for an incrementing counter, a minimum counter value for a decrementing counter), the counter controller 108 is configured to reset the counter before, during, and/or after a remote parking event (e.g., the autonomy unit parking the vehicle 100 into a parking spot). For example, the counter controller 108 is configured to reset an incremental counter to zero. To determine whether to reset the counter, the counter controller 108 compares a current value of the counter to a predetermined threshold. In some examples, the threshold corresponds with a counter value that enables a single remote parking event that is started before the threshold is exceeded by the counter to be completed before the minimum counter value is reached by the counter. For example, the threshold corresponds with a counter value that is less than a maximum value of an incrementing counter and/or greater than a minimum value of a decrementing counter.

When the counter controller 108 detects that the counter has exceeded the threshold, the counter controller monitors for a time to reset the counter and/or the wireless connection with the mobile device 110 during which the user 112 will not notice a delay in remote park-assist communication between the mobile device 110 and the vehicle 100. For example, the counter controller 108 monitors for a reset vehicle event and/or a reset mobile event upon identifying that the counter exceeds the threshold. The counter controller 108 resets the counter and/or the corresponding wireless connection in response to detecting a reset vehicle event and/or a reset mobile event.

Example reset mobile events include (i) activation of a remote park-assist app on the mobile device 110, (ii) activation of another app on the mobile device 110 while remote park-assist is active, (iii) the mobile device 110 conducting a call, text, and/or messaging session while remote park-assist is active, (iv) the user 112 dropping the mobile device 110 while remote park-assist is active, (v) the mobile device 110 being located beyond a tethering range of the vehicle 100 for remote park-assist, and/or (vi) the mobile device 110 not receiving an input from the user 112 for a threshold period of time. Example reset vehicle events include (i) the autonomy unit 102 identifying an available parking spot, (ii) the autonomy unit 102 detecting an obstacle or another stop event while remote park-assist is active, (iii) the autonomy unit 102 detecting that the vehicle 100 has been stationary for a threshold period of time while remote park-assist is active, and/or (iv) the wireless communication module 106 transitioning from a remote park-assist state to a phone-as-a-key state.

Figure 2:
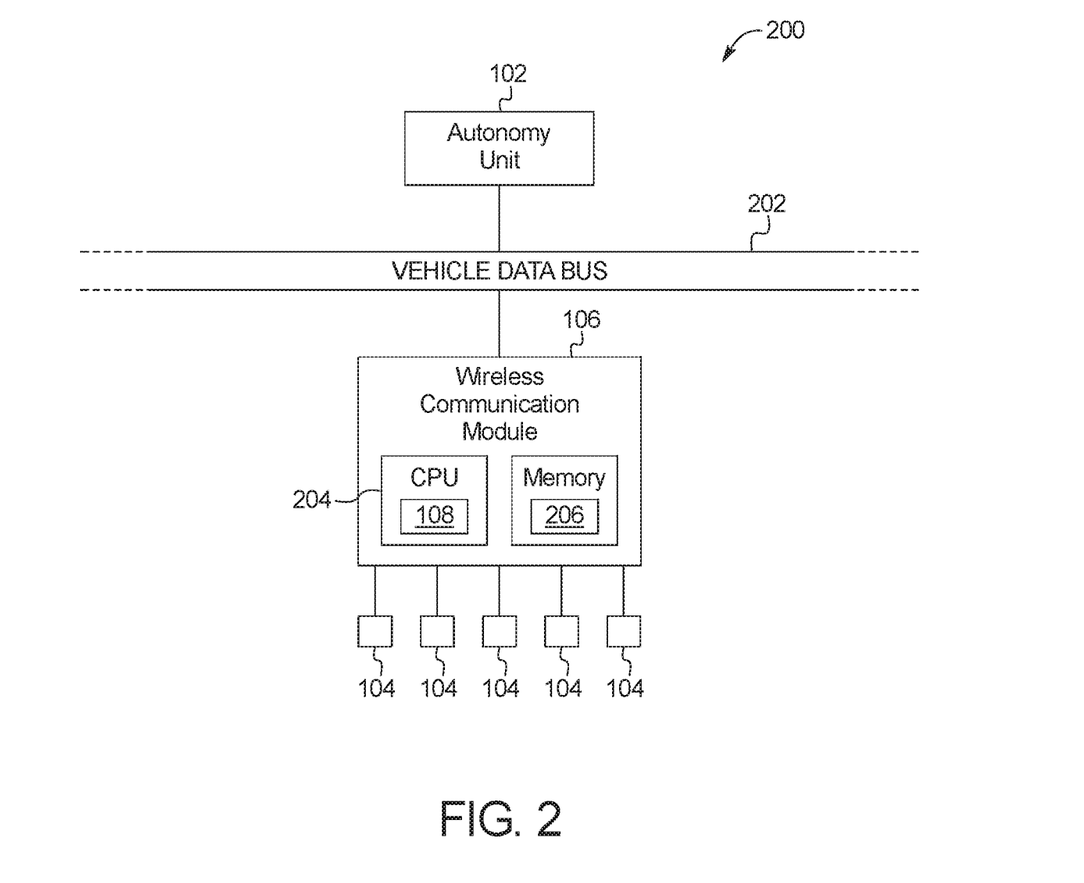
FIG. 2 is a block diagram of electronic components of the vehicle of FIG. 1.

FIG. 2 is a block diagram of electronic components 200 of the vehicle 100. As illustrated in FIG. 2, the electronic components 200 include the autonomy unit 102, the antenna modules 104, the wireless communication module 106, and a vehicle data bus 202.

The wireless communication module 106 includes a processor 204 (also referred to as a central processing unit (CPU) or a microcontroller unit) and memory 206. In some examples, the processor 204 of the wireless communication module 106 is structured to include the counter controller 108. Alternatively, in some examples, the counter controller 108 is incorporated into an ECU with its own processor and memory. The processor 204 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 206 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 206 includes multiple kinds of memory, particularly volatile memory and non-volatile memory.

The memory 206 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 206, the computer readable medium, and/or within the processor 204 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The vehicle data bus 202 communicatively couples the autonomy unit 102 and the wireless communication module 106. In some examples, the vehicle data bus 202 includes one or more data buses. The vehicle data bus 202 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 3:
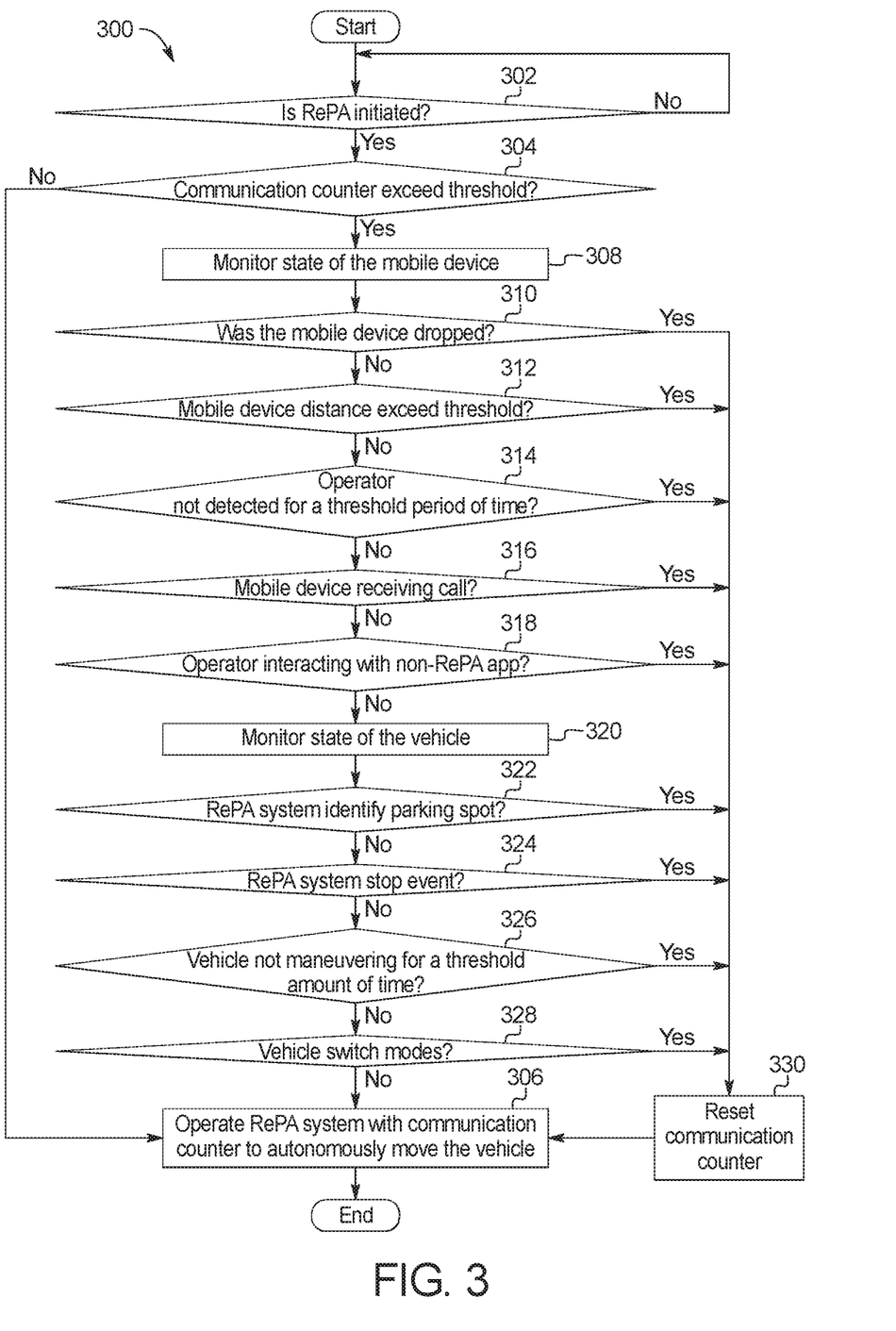
FIG. 3 is a flowchart to manage a communication counter for remote park-assist in accordance with the teachings herein.

FIG. 3 is a flowchart of an example method 300 to manage a communication counter for remote park-assist. The flowchart of FIG. 3 is representative of machine readable instructions that are stored in memory (such as the memory 206 of FIG. 2) and include one or more programs which, when executed by a processor (such as the processor 204 of FIG. 2), cause the vehicle 100 to implement the example counter controller 108 of FIGS. 1-2. While the example program is described with reference to the flowchart illustrated in FIG. 3, many other methods of implementing the example counter controller 108 may alternatively be used. For example, the order of execution of the blocks may be rearranged, changed, eliminated, and/or combined to perform the method 300. Further, because the method 300 is disclosed in connection with the components of FIGS. 1-2, some functions of those components will not be described in detail below.

Initially, at block 302, the counter controller 108 determines whether remote park-assist of the vehicle 100 is initiated by the mobile device 110. In response to the counter controller 108 determining that remote park-assist is not active, the method 300 remains at block 302. Otherwise, in response to the counter controller 108 determining that remote park-assist is active, the method 300 proceeds to block 304. At block 304, the counter controller 108 determines whether a communication counter incorporated into wireless remote park-assist communication between the mobile device 110 and the wireless communication module 106 of the vehicle 100 exceeds a predetermined threshold. In response to the counter controller 108 determining that the communication counter does not exceed the predetermined threshold, the method 300 proceeds to block 306.

At block 306, the autonomy unit 102 operates the remote park-assist system of the vehicle 100 based on the communication counter to autonomously move the vehicle 100. For example, the autonomy unit 102 performs motive functions for remote park-assist when the communication counter of the wireless remote park-assist communication received by the wireless communication module 106 of the vehicle 100 increments (or decrements) sequentially over time. Additionally or alternatively, the autonomy unit 102 does not perform motive functions for remote park-assist when the communication counter of the wireless remote park-assist communication received by the wireless communication module 106 does not increment (or decrement) sequentially over time.

Returning to block 304, in response to the counter controller 108 determining that the communication counter does exceed the predetermined threshold, the method 300 proceeds to block 308. At block 308, the counter controller 108 monitors for a state of the mobile device 110 that is utilized to initiate remote park-assist of the vehicle 100. That is, the counter controller 108 monitors for a reset mobile event of the mobile device 110. In some examples, the counter controller 108 identifies an occurrence of a reset mobile event based upon information included in communication signal(s) that are sent by the mobile device 110 and received by the wireless communication module 106 of the vehicle 100. For example, the counter controller 108 detects an occurrence of a reset mobile event upon identifying that a remote park-assist app has been activated on the mobile device 110 by the user 112.

At block 310, the counter controller 108 determines whether the mobile device 110 was dropped by the user 112 while the remote park-assist is active. For example, the counter controller 108 determines whether the mobile device 110 was dropped based upon information sent by the mobile device 110 to the vehicle 100. In some such examples, the mobile device 110 includes an accelerometer that detects the dropping of the mobile device 110 and a communication module that sends a corresponding message to the vehicle 100. Additionally or alternatively, the counter controller 108 determines that the mobile device 110 has dropped based upon image(s) and/or video captured by exterior camera(s) of the vehicle 100. In response to the counter controller 108 determining that the mobile device 110 was dropped, the counter controller 108 detects the occurrence of a reset mobile event and the method 300 proceeds to block 330. Otherwise, in response to the counter controller 108 determining that the mobile device 110 was not dropped, the method 300 proceeds to block 312.

At block 312, the counter controller 108 determines whether a distance between the mobile device 110 and the vehicle 100 exceeds a threshold. For example, the counter controller 108 determines whether the mobile device 110 is located beyond a tethering range of the vehicle 100 for remote park-assist. In some examples, the counter controller 108 determines the relative distance and/or location of the mobile device 110 based upon signal strengths (e.g., received signal strength indicators) and/or times-of-flight of communication between the mobile device 110 and the antenna modules 104 of the vehicle 100. In some examples in which the mobile device 110 also functions as a phone-as-a-key, the counter controller 108 determines the relative distance and/or location of the mobile device 110 based upon signal strengths and/or times-of-flight of communication between the antenna modules 104 of the vehicle 100 and another mobile device (e.g., a key fob) of the user 112. Further, in some examples, the counter controller 108 determines whether the mobile device 110 has been located beyond the tethering range of the vehicle 100 for a threshold period of time. In response to the counter controller 108 determining that the distance between the mobile device 110 and the vehicle 100 exceeds the threshold, the counter controller 108 detects the occurrence of a reset mobile event and the method 300 proceeds to block 330. Otherwise, in response to the counter controller 108 determining that the distance between the mobile device 110 and the vehicle 100 does not exceed the threshold, the method 300 proceeds to block 314.

At block 314, the counter controller 108 determines whether the user 112 of the mobile device 110 has not been detected for a threshold period of time while the remote park-assist is active. For example, the counter controller 108 determines whether the mobile device 110 has not received an input from the user 112 for a threshold period of time. In some examples, the mobile device 110 is configured to detect the user 112 via a touch matrix, a touchscreen, an activation switch, a dead-man switch, a fingerprint sensor, camera facial recognition, and/or other input device(s). In response to the counter controller 108 determining that the user 112 has not been detected for the threshold period of time, the counter controller 108 detects the occurrence of a reset mobile event and the method 300 proceeds to block 330. Otherwise, in response to the counter controller 108 determining that the user 112 of the mobile device 110 has been detected within the threshold period of time, the method 300 proceeds to block 316.

At block 316, the counter controller 108 determines whether the mobile device 110 is conducting a call while remote park-assist is active. Additionally or alternatively, the counter controller 108 determines whether the mobile device 110 is conducting a text session and/or a messaging session while remote park-assist is active. Further, in some examples, the counter controller 108 determines whether the mobile device 110 is conducting a call and/or session for a threshold period of time. In response to the counter controller 108 determining that the mobile device 110 is conducting a call and/or session, the counter controller 108 detects the occurrence of a reset mobile event and the method 300 proceeds to block 330. Otherwise, in response to the counter controller 108 determining that the mobile device 110 is not conducting a call and/or session, the method 300 proceeds to block 318.

At block 318, the counter controller 108 determines whether the user 112 is interacting with another app of the mobile device 110 other than the remote park-assist app while the remote park-assist is active. Additionally or alternatively, the counter controller 108 determines whether the user 112 is interacting with another function of the mobile device 110 (e.g., a camera feature) while remote park-assist is active. Further, in some examples, the counter controller 108 determines whether the user 112 is interacting with another app and/or function of the mobile device 110 for a threshold period of time. In response to the counter controller 108 determining that the user 112 is interacting with another app and/or feature of the mobile device 110, the counter controller 108 detects the occurrence of a reset mobile event and the method 300 proceeds to block 330. Otherwise, in response to the counter controller 108 determining that the user 112 is not interacting with another app and/or feature of the mobile device 110, the method 300 proceeds to block 320.

At block 320, the counter controller 108 monitors for a state of the vehicle 100. That is, the counter controller 108 monitors for a reset vehicle event of the vehicle 100. At block 322, the counter controller 108 determines whether the autonomy unit 102 is identifying an available parking spot while the remote park-assist is active. For example, the autonomy unit 102 identifies an available parking spot based upon image(s) and/or video captured by exterior camera(s) of the vehicle 100 and/or data collected by proximity sensor(s) of the vehicle 100. In response to the autonomy unit 102 identifying an available parking spot, the counter controller 108 detects the occurrence of a reset vehicle event and the method 300 proceeds to block 330. Otherwise, in response to the autonomy unit 102 not identifying an available parking spot, the method 300 proceeds to block 324.

At block 324, the counter controller 108 determines whether the autonomy unit 102 is detecting an obstacle and/or another stop event while the remote park-assist is active. For example, the autonomy unit 102 identifies an obstacle based upon image(s) and/or video captured by exterior camera(s) of the vehicle 100 and/or data collected by proximity sensor(s) of the vehicle 100. The autonomy unit 102 identifies a stop event, for example, upon receipt of a stop instruction sent from the user 112 via the mobile device 110. In response to the autonomy unit 102 identifying an obstacle and/or another stop event, the counter controller 108 detects the occurrence of a reset vehicle event and the method 300 proceeds to block 330. Otherwise, in response to the autonomy unit 102 not identifying an obstacle and/or another stop event, the method 300 proceeds to block 326.

At block 326, the counter controller 108 determines whether the autonomy unit 102 is detecting that the vehicle 100 has been stationary for a threshold period of time while the remote park-assist is active. For example, the autonomy unit 102 identifies whether the vehicle 100 is moving based upon data collected via an inertial measurement unit (IMU), accelerometer(s), and/or other sensor(s) of the vehicle 100. In response to the autonomy unit 102 identifying that the vehicle 100 has been stationary for the threshold period of time, the counter controller 108 detects the occurrence of a reset vehicle event and the method 300 proceeds to block 330. Otherwise, in response to the autonomy unit 102 not identifying that the vehicle 100 has been stationary for the threshold period of time, the method 300 proceeds to block 328.

At block 328, the counter controller 108 determines whether the wireless communication module 106 is transitioning from a remote park-assist state to a phone-as-a-key state. For example, the wireless communication module 106 communicates with the mobile device 110 for remote park-assist when in the remote park-assist state. Further, the wireless communication module 106 communicates with the mobile device 110 for passive-start, passive-entry, and/or remote keyless entry when in the phone-as-a-key state. In response to the counter controller 108 determining that the wireless communication module 106 is not transitioning to another operation state, the method 300 proceeds to block 328. That is, the method 300 proceeds to block 328 upon the counter controller 108 detecting neither a reset mobile event nor a reset vehicle event. Otherwise, in response to the counter controller 108 determining that the wireless communication module 106 is transitioning to another operation state, the counter controller 108 detects the occurrence of a reset vehicle event and the method 300 proceeds to block 330.

At block 330, the counter controller 108 resets the communication counter for the remote park-assist of the vehicle 100. Further, in some examples, the counter controller 108 also resets the wireless connection between the mobile device 110 and the antenna modules 104 of the vehicle 100 when the communication counter is reset.

An example disclosed vehicle includes an autonomy unit for remote parking, a communication module, and a controller. The controller is to implement a counter into remote parking communication between the communication module and a mobile device and, when the counter exceeds a threshold, monitor for a reset vehicle event and a reset mobile event. The controller also is to reset the counter responsive to detecting at least one of the reset vehicle event and the reset mobile event.

In some examples, the autonomy unit performs the remote parking in response to the controller determining that the counter of the remote parking communication received by the communication module increments sequentially. In some such examples, the autonomy unit does not perform the remote parking in response to the controller determining that the counter of the remote parking communication received by the communication module does not increment sequentially.

In some examples, the controller is configured to reset the counter to zero. In some examples, the threshold corresponds with a counter value that is less than a maximum value of the counter.

In some examples, the controller is configured to identify the reset mobile event based upon information included in a communication signal received by the communication module from the mobile device. In some examples, the reset mobile event includes activation of a remote parking app on the mobile device. In some such examples, the reset mobile event includes user interaction with another app of the mobile device while the remote parking is active. In some examples, the reset mobile event includes the mobile device conducting at least one of a call, a text session, and a messaging session while the remote parking is active. In some examples, the reset mobile event includes a user dropping the mobile device while the remote parking is active. In some examples, the reset mobile event includes the mobile device being located beyond a tethering range for the remote parking. In some examples, the reset mobile event includes the mobile device not receiving an input from a user for a threshold period of time while the remote parking is active.

In some examples, the reset vehicle event includes the autonomy unit identifying an available parking spot while the remote parking is active. In some examples, the reset vehicle event includes the autonomy unit detecting an obstacle or another stop event while the remote parking is active. In some examples, the reset vehicle event includes the autonomy unit detecting that the vehicle has been stationary for a threshold period of time while the remote parking is active. In some examples, the reset vehicle event includes the controller detecting whether the communication module is transitioning from a remote parking state to a phone-as-a-key state.

An example disclosed method includes implementing, via a processor of a vehicle, a counter into remote parking communication between a communication module of the vehicle and a mobile device. The example disclosed method also includes monitoring, via the processor, for a reset vehicle event and a reset mobile event when the counter exceeds a threshold and resetting, via the processor, the counter responsive to detecting at least one of the reset vehicle event and the reset mobile event.

Some examples further include performing, via an autonomy unit, the remote parking when the counter of the remote parking communication received by the communication module decrements sequentially. Some such examples further include not performing the remote parking when the counter of the remote parking communication received by the communication module does not decrement sequentially.

Some examples further include identifying the reset mobile event based upon information included in a communication signal received by the communication module from the mobile device.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise"

respectively. Additionally, as used herein, the terms "module" and "unit" refer to hardware with circuitry to provide communication, control and/or monitoring capabilities, often in conjunction with sensors. A "module" and a "unit" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
an autonomy unit for remote parking;
a communication module; and
a controller configured to:
send a first signal including a first counter from the communication module to a mobile device;
determine, based on the first counter, a communication latency between the communication module of the vehicle and a mobile device;
determine that a current value of the first counter exceeds a threshold;
monitor, based on the determination that a current value of the first counter exceeds a threshold, for at least one of: a reset vehicle event and a reset mobile event; and
reset the first counter responsive to detecting at least one of the reset vehicle event and the reset mobile event.

2. The vehicle of claim 1, wherein the controller is further configured to:
send a second signal including a second counter from the communication module to the mobile device;
receive a response to the first signal and a response to the second signal at the communication mobile and from the mobile device, wherein the response to the first signal includes the first counter and the response to the second signal includes the second counter;
determine that the first counter and second counter are received by the communication module in a same order in which they were sent to the mobile device; and
send an instruction to the autonomy unit to perform the parking based on the determination that the first counter and second counter are received by the communication module in the same order in which they were sent to the mobile device.

3. The vehicle of claim 2, wherein the autonomy unit does not perform the remote parking in response to the controller determining that the counter of the remote parking communication received by the communication module does not increment sequentially.

4. The vehicle of claim 1, wherein the controller is configured to reset the counter to zero.

5. The vehicle of claim 1, wherein the threshold corresponds with a counter value that is less than a maximum value of the counter.

6. The vehicle of claim 1, wherein the controller is configured to identify the reset mobile event based upon information included in a communication signal received by the communication module from the mobile device.

7. The vehicle of claim 1, wherein the reset mobile event includes activation of a remote parking app on the mobile device.

8. The vehicle of claim 7, wherein the reset mobile event includes user interaction with another app of the mobile device while the remote parking is active.

9. The vehicle of claim 1, wherein the reset mobile event includes the mobile device conducting at least one of a call, a text session, and a messaging session while the remote parking is active.

10. The vehicle of claim 1, wherein the reset mobile event includes a user dropping the mobile device while the remote parking is active.

11. The vehicle of claim 1, wherein the reset mobile event includes the mobile device being located beyond a tethering range for the remote parking.

12. The vehicle of claim 1, wherein the reset mobile event includes the mobile device not receiving an input from a user for a threshold period of time while the remote parking is active.

13. The vehicle of claim 1, wherein the reset vehicle event includes the autonomy unit identifying an available parking spot while the remote parking is active.

14. The vehicle of claim 1, wherein the reset vehicle event includes the autonomy unit detecting an obstacle or another stop event while the remote parking is active.

15. The vehicle of claim 1, wherein the reset vehicle event includes the autonomy unit detecting that the vehicle has been stationary for a threshold period of time while the remote parking is active.

16. The vehicle of claim 1, wherein the reset vehicle event includes the controller detecting whether the communication module is transitioning from a remote parking state to a phone-as-a-key state.

17. A method comprising:
sending, via a processor of a vehicle, a first signal including a first counter from a communication module of the vehicle to a mobile device;
determining, based on the first counter, a communication latency between the communication module of the vehicle and a mobile device;
determining that a current value of the first counter exceeds a threshold;
monitoring, via the processor and based on the determination that a current value of the first counter exceeds a threshold, for a reset vehicle event and a reset mobile event; and
resetting, via the processor, the counter responsive to detecting at least one of the reset vehicle event and the reset mobile event.

18. The method of claim 17, further including performing, via an autonomy unit, the remote parking when the counter of the remote parking communication received by the communication module decrements sequentially.

19. The method of claim 18, further including not performing the remote parking when the counter of the remote parking communication received by the communication module does not decrement sequentially.

20. The method of claim 17, further including identifying the reset mobile event based upon information included in a communication signal received by the communication module from the mobile device.

* * * * *